(12) United States Patent
David et al.

(10) Patent No.: US 7,319,219 B2
(45) Date of Patent: Jan. 15, 2008

(54) SYSTEM FOR HANDLING LIGHT FOR INTENSIFICATION BY AN IMAGE INTENSIFIER

(75) Inventors: Ofer David, Haifa (IL); Yehuda Borenstein, Haifa (IL)

(73) Assignee: Elbit Systems Ltd, Rehovot (IL)

( * ) Notice: Subject to any disclaimer, the term of this patent is extended or adjusted under 35 U.S.C. 154(b) by 31 days.

(21) Appl. No.: 10/538,963

(22) PCT Filed: Dec. 16, 2003

(86) PCT No.: PCT/IL03/01079

§ 371 (c)(1),
(2), (4) Date: Aug. 4, 2005

(87) PCT Pub. No.: WO2004/056091

PCT Pub. Date: Jul. 1, 2004

(65) Prior Publication Data

US 2006/0060758 A1 Mar. 23, 2006

(30) Foreign Application Priority Data

Dec. 16, 2002 (IL) .................................... 153482

(51) Int. Cl.
*H01J 40/14* (2006.01)
(52) U.S. Cl. .......................... 250/214 VT; 250/214 R
(58) Field of Classification Search ......... 250/214 VT, 250/214 R, 214.1, 207; 313/524, 528, 534
See application file for complete search history.

(56) References Cited

U.S. PATENT DOCUMENTS

| | | | |
|---|---|---|---|
| 4,882,481 A * | 11/1989 | Gilligan et al. ....... | 250/214 VT |
| 5,438,452 A | 8/1995 | Gruber | |
| 5,872,595 A | 2/1999 | Monahan | |
| 6,069,352 A | 5/2000 | Gutin et al. | |
| 6,323,474 B1 | 11/2001 | Bacarella et al. | |

* cited by examiner

*Primary Examiner*—Que T Le
(74) *Attorney, Agent, or Firm*—Eitan Law Group (57) ABSTRACT

The application disclose a system for handling light that is amenable for intensification by an Image Intensifier and a method for handling the same, wherein the system includes light regulating means for regulating light intensity of the transmissive MEMS (Micro Electro Mechanical System) type in order to prevent light rays emanating from intensely bright light areas from reaching the input plane of the image intensifier, or (instead of using said transmissive MEMS), the system implement light regulating means of the reflective MEMS type and while utilizing the reflective MEMS, the image intensifier is driven to operate in a gating mode, in order to time the light intensifying action of the intensifier to start upon the specific time slot that was essentially completed, of deflecting the light rays emanating from intensely bright light areas away from the input plane of said image intensifier.

10 Claims, 8 Drawing Sheets

SYSTEM FOR HANDLING LIGHT FOR INTENSIFICATION BY AN IMAGE INTENSIFIER

CROSS-REFERENCE TO RELATED APPLICATIONS

The application is a National Phase Application of PCT International No. PCT/IL03/01079, International Filing Date 16 Dec. 2003, claiming priority of Israeli Patent Application IL153482, filed 16 Dec. 2002.

FIELD OF THE INVENTION

The present invention relates to the field of Image Intensifiers and their control systems in general, and to methods and means for reducing the common phenomena of "glare" or "bloom" inherent in Image Intensifiers.

BACKGROUND OF THE INVENTION

An image intensifier is an electronic device that produces a radiation pattern by electrically amplifying an image focused on the photosensitive surface of its photo cathode and presenting the amplified image on a fluorescent screen at the output. One widespread major application of image intensifiers is their use in night vision devices serving the military as well as other law enforcing agencies. Under very low illumination conditions, an image intensifier is capable of collecting and exploiting the low count of photons available in the environment and intensifying their image by factors of 50,000 to 100,000 providing good observation conditions in otherwise dark, barely illuminated places.

However, image-intensifying technologies are susceptible to harmful "glare" or "bloom" phenomena. Due to the fact that the entire field of view (hereinafter FOV) is intensified uniformly, a locally highly bright illuminated source can "blind" the system, causing possible permanent damage to the image intensifier. Such damage is caused by the light of the bright sources when intensified by a factor of approximately thousands times while being focused on the photo cathode.

To prevent the occurrence of such a potential damage, the gain of the Image Intensifier should be decreased or its exposure time (gating) should be shortened. Employing said reduction techniques; it is possible to protect the tube—albeit by doing so the brightness of the entire image evidently might be reduced—resulting in probable deterioration of the user's night surveillance performance. It is important to note that the action of providing protection from excessively bright sources by gating the number of collected incident photons that would be amplified, or by employing automatic brightness control that would reduces the power of intensification, affects uniformly the entire field of view and thus the overall performance deteriorates due to lowering the sensitivity and the contrast qualities of the system's image. Moreover, bright light sources create an additional interference due to the intensified processed image—namely the appearance of a halo around the displays of the bright areas.

The implementation of a micro mirrors array coupled to associated optics in order to control the intensity of the "processed intensified light" is described in U.S. Pat. No. 6,069,352. A control circuit determines whether a pixel's intensity is above or below a preset threshold level. In case it is above it, the corresponding elements of the micro mirror's array will deflect the incident light at that specific area, thereby eliminating saturation of the image intensifier from those pixels. Thus, the remainder of the image is unchanged and used for continued viewing. A continuous feedback loop monitors the intensity level of the pixels and actively controls the incident light governed by the micro mirror array.

The technology described in the above-cited US patent employs a Micro Mirrors Array (referred to as "MMA" in the terminology of that patent) for its operation. This device is also known in the field by the acronym DMD (Digital Micro Mirror Device) and appears in the literature also as MEMS (Micro Electro Mechanical System), as well as MOEMS (Micro Opto Electro Mechanical Systems) and of late also as "reflective spatial light modulator mirrors"—herein after: reflective MEMS. Such reflective MEMS can be commercially purchased off the shelf, for example from Texas Instruments, Inc.

In the application as described in the above-mentioned documented patent for using the reflective MEMS, there is a built in drawback: moving (shifting) one or more reflective MEMS mirror/s of the micro mirrors array, requires a given duration (time). For example, the elapsed time associated with the rotation of the mirror about a-hinge, a movement that calls for an appropriate response (reaction) time which is the time it takes until the unwanted glare is deflected from the image intensifier's input plane—unto which the reflective mirror was reflecting initially. Naturally, the mirror's movement, which lasts for some time, generates a "smearing" of the glare's light over substantial portion of Image Intensifier's input plane before deflected away from the input plane surface. This "smearing" is enhanced by the Image Intensifier itself, as long as the glare of the light keeps impinging on the image intensifier entrance plane, that is, until it will be totally deflected away from the entrance plane.

Another known practice is implemented by a technology known and recognized as "the flipping pixel", which is bi-stable at 0°-180° or 0°-90°. It enables forming an array of mechanical nano—optical shutters that allow a fast control of whatever part of the area of a target that will receive the desired signal radiation and of the area that would not receive it and this subject to high spatial resolutions. A shutter array comprises a matrix of optical shutters positioned between a radiant source and a target. Every one of the shutters in the matrix is endowed by an "ON" state that allows light to pass through it and arrive at the target, and an "OFF" state that blocks the light from the source and prevents it from impinging on the target.

This referred to "other technology" is also known as "Micro Electro Mechanical Systems" (MEMS) and also as "Micro Opto Electro Mechanical System" (MOEMS) transmissive spatial light micros—hereinafter: transmissive MEMS. Such a technology is described, per instance, in the article "Bi-Stable Flat Panel Display Based on a 180° or Preferred 0°-90° Flipping Pixel" by Flixel Ltd. Company (at its site: WWW.flixel.com).

SUMMARY OF THE INVENTION

The proposed innovation disclosed in the present invention enables to control the amount of light that enters the input tube of an image intensifier from a specific observed area. The capability to control the amount of light entering the image intensifier enables to achieve optimal operation conditions of operating at maximum gain or exposure periods even when bright sources are located inside the FOV, and this without degrading the quality of the overall scene image.

These beneficial capabilities are achieved by the technology provided by the present invention, by interlacing a means that regulates the "quantity of light" entering the image intensifier, in accordance with specific areas of intense bright light which the new means detects by employing a control and feedback circuit devise.

In accordance with the present invention, the light regulating means might be a transmissive MEMS component (and not only a reflective MEMS component)—that is positioned in the optical focus plane of the arena being the subject of surveillance or observation, and inserted before the photo sensitive area of the image intensifier—in accordance with the specific configuration of implementing the invention.

The added means that regulates the light, namely the control and feedback circuit, includes—as previously, the cited image sensor that detects intensely bright light areas, and in addition an image processing means that relates the intensely bright light areas that were detected using the image sensor, to the respective areas of the light regulating means, in a manner that enables selective operation of the light regulating means in said intensely bright light areas in order to influence the image being received by the image intensifier.

In one embodiment, the present invention upgrades the known earlier mentioned configuration of applying a reflective MEMS component, by having the control and feedback circuit operate the image intensifier in a "gating mode", thus managing to time the light intensifying provided by the image intensifier to the specific time slot after deflecting the light rays emanating from the intensely bright light areas away from the input plane of the image intensifier was essentially completed.

In other words, one improvement in a system that is based on reflective MEMS and that will be, in accordance with the present invention, is distinguished by the fact that the "smearing" phenomena referred to earlier (see the "Background of the invention" chapter), is now prevented. This is achieved by the Control and Feedback Circuit that ensures that no intensification of light is performed before the mechanical operation of moving the mirrors array is completed and therefore—the beam of light that would have generated blinding was shifted sideways completely to a region that is not located on the input plane surface of the image intensifier.

In a second configuration of the present invention, the system does not include reflective MEMS (such as that described, for example, in U.S. Pat. No. 6,069,532), but is rather implemented using transmissive MEMS.

In another preferred configuration of the present invention, the image intensifier is endowed with the capability of operating in a gating mode. The system is integrated into a surveillance system that is based on gating imaging, with or without an auxiliary source of light that illuminates the target (for example, a laser beam source), for obtaining timed light reflections from the target.

BRIEF DESCRIPTION OF THE DRAWINGS

The present invention will be more fully understood and appreciated by noting the following detailed description, taken in conjunction with the drawings, in which.

DETAILED DESCRIPTION OF THE DRAWINGS

Figure 1:
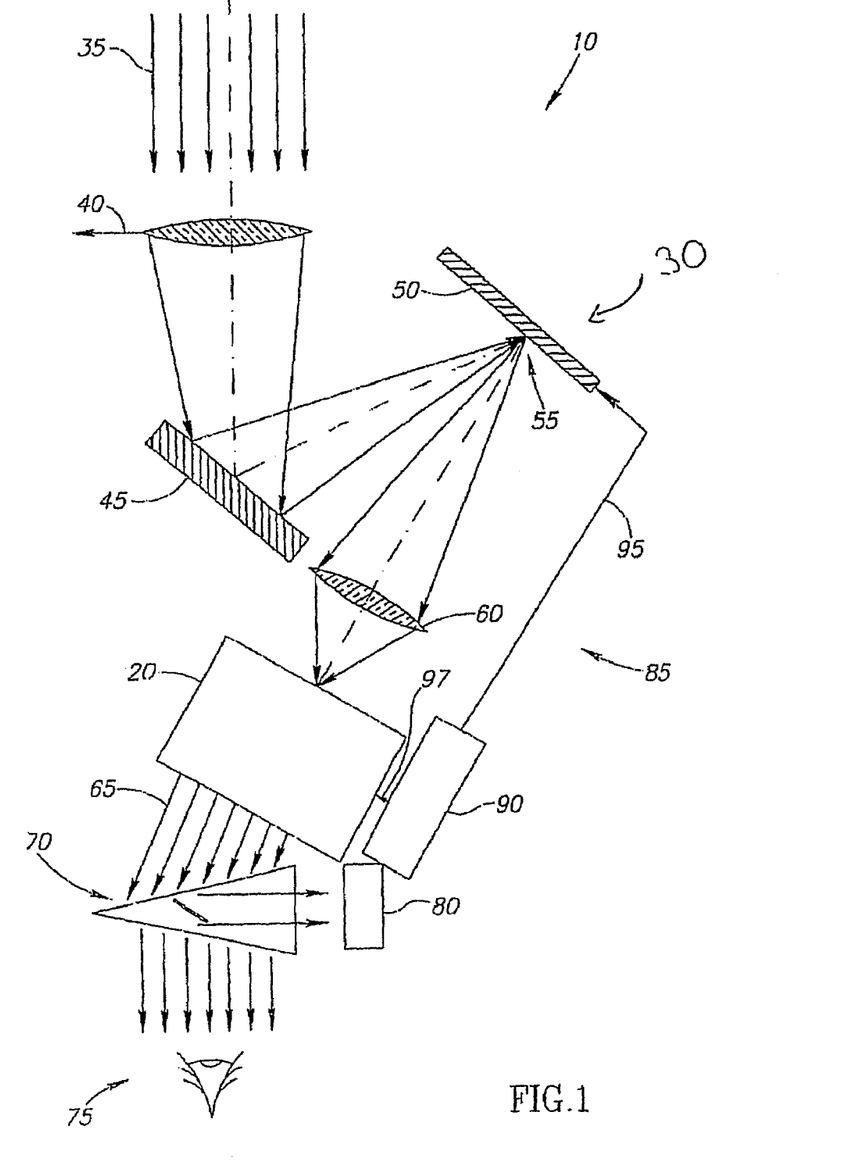
FIG. 1 is a schematic illustration of a passive night sighting system, wherein one configuration of the present invention is embodied, namely regulating the light that enters specific areas of the image intensifier by employing a light regulating means of the reflective MEMS type, where in addition, the control and feedback circuit device is simultaneously actuating the image intensifier in a gating mode, timing the light intensification provided by the image intensifier to the time slot after deflecting the light rays emanating from the intensely bright light areas away from the input plane of the image intensifier was essentially completed.

Referring to FIG. 1., The drawing is a schematic illustration of a passive night viewing system 10. In this system 10, a reflective MEMS type component 30 performs the regulation of light that enters the image intensifier 20.

The structure of system 10, is verily similar to the structure of a system that was described earlier (referred to as background of the invention), for example in—U.S. Pat.

No. 6,069,352—the contents of which is hereby incorporated by reference, but the difference between system 10 and the systems referred to under the prior art citation, is found in the solution of the "smearing" phenomena effect as provided by system 10, in accordance with the description further below.

Photons 35 that are reflected from the surrounding environment to the objective lens 40, are not received directly by the image intensifier 20 but rather directed first through an intermediate route to impinge on tilt mirror 45 by it towards spatial light modulators 50, located at the focal plane of image intensifier 20 and implemented by reflective MEMS made of an array of micro mirrors 55.

The micro mirrors 55 control the number of photons entering different selected areas of image intensifier 20 in a known way that is described for example in patent U.S. Pat. No. 6,069,352

Through lens 60, image intensifiers 20 receive the photons being reflected from mirrors 55.

The intensified light 65 following its path through image intensifier 20 is directed towards a splitter component 70. This splitter component 70 splits the intensified image and projects it in parallel towards two directions. In one direction it is aimed at the viewer's system 75 (in the illustrated example, this is the human observer's eye), whereas the second beam is directed towards image sensor 80, which might be for example a CCD camera or a CMOS device. Note also that the illustrated person's eye 75 can be replaced by a display screen or by means to transfer the image onwards, say to a remote viewing implement.

Image sensor 80 constitutes the first component of the control and feedback circuit means 85 that operates—in a selective manner—the reflective MEMS mirrors 55. Image sensor 80 receives the intensified image and detects intense bright light sources in the arena under surveillance.

Image processor 90 is connected to image sensor 80 and performs analysis of the image received by image sensor 80. A light source whose intensity is higher than a selected preset threshold value will be defined as "a source of intense bright light" for the sake of treatment by the system. The analysis designates the specific area/s; one or more, in which intensely bright light sources were detected that appear in the image received by image sensor 80, applying them to the relevant sectors in the reflective MEMS mirrors 55 array.

In other words—the detection of sources of intense bright light at a specific spatial position over the image that was received by the image sensor 80, necessarily indicates a reflective projection that arrived from the mirror/s, one or more, whose specific location/s is/are also specific and known. This one to one correspondence assignment of the location of the point causing the "glare" or "bloom" and the specific mirror or group of mirrors, enables the desired selective operation of mirrors 55 through the control and feedback circuit component 95. For example, it is possible to limit the routing of the light from that specific mirror or group of mirrors for a selected defined time slot, so that the image received at the viewer's system 75 shall not be degraded nor be subjected to "glare" or "bloom" emitting from that region.

An essential feature that characterizes the present invention in regard to the reflective MEMS based configuration illustrated in FIG. 1, namely the configuration in which the light regulating means is of the reflective MEMS 30 type component, is in the arrangement by which the control and feedback circuit means 95 operates (see 97), image intensifier 20 in the desired gating mode.

Operating the image intensifier 20 in the gating mode is conducted in order to achieve correct timing of the light intensification by image intensifier 20 to coincide with the time slot that was essentially completed, of deflecting the light rays emanating from the intensely bright light areas away from the input plane of the image intensifier. If, say, intense light regions would have been detected, namely entities that would have caused glare and degrade the quality of the image or even cause damage to the intensifier tube, the image processor 90 would have shut down the image intensifier 20 for a definite period of time that is essentially equal to the time that would have been necessary for deflecting one or more reflective mirror/s of the micro mirrors array 55, i. e., move them away from the state of routing the beam to the input opening plane of the image intensifier to a state of routing the beam to a far away direction (e.g., to a light trap—not shown in the illustration).

To recapitulate—the above discussion relates to switching the image intensifier for a temporary duration to a switched off (i.e., shut down) condition, this time being equal to the time duration that would have been required for the rotation of the mirror around a hinge, a movement that call for a relatively long reaction and operation time, a continuous action that would last until the glare of the light is deflected from the input plane region of the image intensifier 20, unto which the reflective mirror was pointed in the beginning.

In this manner, the reception of a "smearing" glaring light over the input plane region of the image intensifier 20 is prevented, and as derived from it, the smearing radiation is not intensified by the neutralized (shut down) image intensifier 20, as long as the intense bright light causing glare was not deflected away and driven entirely out of bounds from the input plane region of the image intensifier 20.

The image processor 90 switches the image intensifier 20 back to its normal intensifying state, after the said short period (for example—10 milliseconds) terminates, namely the time required for the reflective MEMS 30 to vary the position of its micro mirror/s (one or more), in the zones in which light beams emanating from the intense bright light regions are impinging (which are the beams causing the bright zones in the intensified image).

Any professional in this field would understand, that image intensifier 20 might also have an additional gating capability (and not only for shutting down its operation during the time slot in which the mirrors are moving in the reflective MEMS component). The system might be, for example, a part of an observation and surveillance system that is based on gated imaging with or without an auxiliary illuminating source that illuminates a target (for example, a laser beam source), for receiving timed light reflections from the illuminated target.

Figure 2:
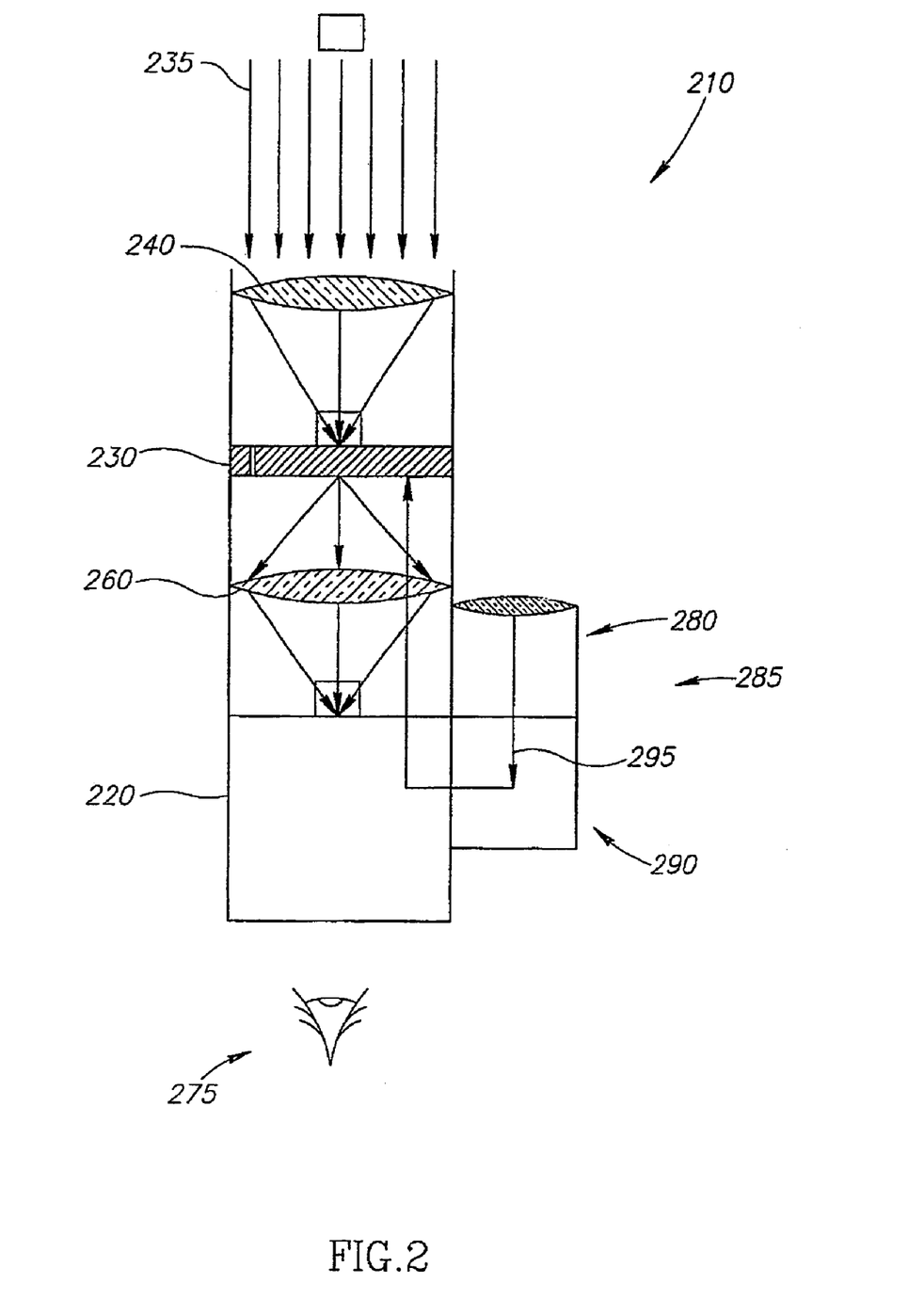
FIG. 2 is a schematic illustration of a passive night viewing system, wherein a second configuration of the present invention is embodied, namely regulating the light that enters specific areas of the image intensifier by employing a light regulating means of the transmissive MEMS type component.

Let's refer now to FIG. 2. FIG. 2 is a schematic illustration of a passive night viewing system 210, wherein a second configuration of the present invention is embodied, namely regulating the light that enters specific areas of the image intensifier 220 by employing a light regulating device of the transmissive MEMS type component 230.

System 210, by being based on transmissive MEMS, is indeed absolutely different in its structural aspect from those system referred to under the "prior art" reference. For example, the system described in U.S. Pat. No. 6,069,352 that relies on incorporating reflective MEMS in it.

In the specific configuration illustrated in this drawing, the image sensor 280 component is located substantially parallel to the line of sight (LOS) of the image intensifier 220 and receives, in an independent mode, light reflections from the area being observed. Any professional in this field would understand that in this parallel configuration, the need for a splitter no longer exists (see splitter 70 in FIG. 1). Concurrently, any professional in this field would understand, that it is possible to locate the intensely bright light sources in the arena being observed, also by employing a control and feedback circuit means in which the image sensor receives the image from a splitter at the output the image intensifier (in a similar fashion to that illustrated in FIG. 1) in a configuration in which the image sensor does not independently observe the field of view.

In accordance with the present invention, photons 235 that are reflected from the surrounding environment to the objective lens 240 are not received directly by the image intensifier 220 but rather pass first through a transmissive MEMS 230.

An outstanding advantage inherent in the present invention over the earlier (referred to) systems, is gained by using the transmissive MEMS rather than the reflective MEMS.

A major salient advantage is the outcome of the fact that a transmissive system, by definition can "transfer" a larger quantity of light than any reflective system, and this advantage is an extremely essential feature ameliorating night vision systems, as in such systems the amplifier would benefit from any additional quantity of light it might receive.

Additional advantage of implementing transmissive MEMS rather than using an application that implements reflective MEMS (such as was described under the prior art presentation), which really is a successful synergism, stems from the fact that the whole system turns out to be a simpler system. Moreover from the aspect of the number of required components, their relative cost and the physical dimension of such system, all that is required is to position the transmissive MEMS in the focal plane, rather than being burdened by directing lenses and light traps, and thus—straightforward, the physical size of the system becomes a more compact one.

One more additional advantage is gained through implementing the transmissive MEMS, as it results in shorter response reaction times, (approximately 1 μs, as compared to the 10 μs that was found inherent when materializing a system with reflective MEMS configuration).

An additional fact to be noted is that operating the transmissive MEMS does not involve "passing" and "smearing" of the light beams whose arrival at the said input plane of the image intensifier one wishes to prevent. See the innovative approach of the present invention for solving this problem, by referring to the configuration illustrated in FIG. 1.

Image intensifier 220 receives the photons passing through transmissive MEMS 230 and lens 260. Once again, any professional in this field would understand, that image intensifier 220 may have the gating capability with or without an auxiliary source that illuminates the target (for example, a laser beam source), for obtaining timed light reflections from the selected target.

The intensified light arriving from the image intensifier 220 projects the image unto the viewer's system 275 (in the illustrated example—a person's eye).

Image sensor 280 (for example, a CCD camera or a CMOS device) constitutes the first component of the control and feedback circuit means 285 that selectively operates the transmissive MEMS 230. Image sensor 280—in the current configuration (see FIG. 2) is independently viewing the same field of view that is concurrently observed by image intensifier 220. Image sensor 280 detects intensely bright light sources located within its field of view. Image processor 290 is connected to Image sensor 280 and performs an analysis of the image received by image sensor 280. In accordance with the stipulations of the present invention, the analysis relates the specific area/s, one or more, in which intensely bright light sources were detected within the sector under observation, with the respective sectors in the transmissive MEMS 220 array.

In other words, detecting an intensely bright light point at a specific location of the image received by image sensor 280, of necessity points at and shows that light was in addition transferred in parallel—also through one or more specific passages in the transmissive MEMS 230, whose positions are also specific and recognized. This one to one corresponding relation between the location of the glare source in the image that was observed by the image sensor 280, to the specific passage or group of specific passages through the transmissive MEMS 230, enables selective operation of the transmissive MEMS 230. Selective operation which is implemented by the control feedback 295. For example, it is possible to limit the passage of light from that given passage or group of passages for a certain selected duration of time, so that the image being received at the viewer's viewing system 275, shall not be impaired by glaring light from that same area.

Figure 3:
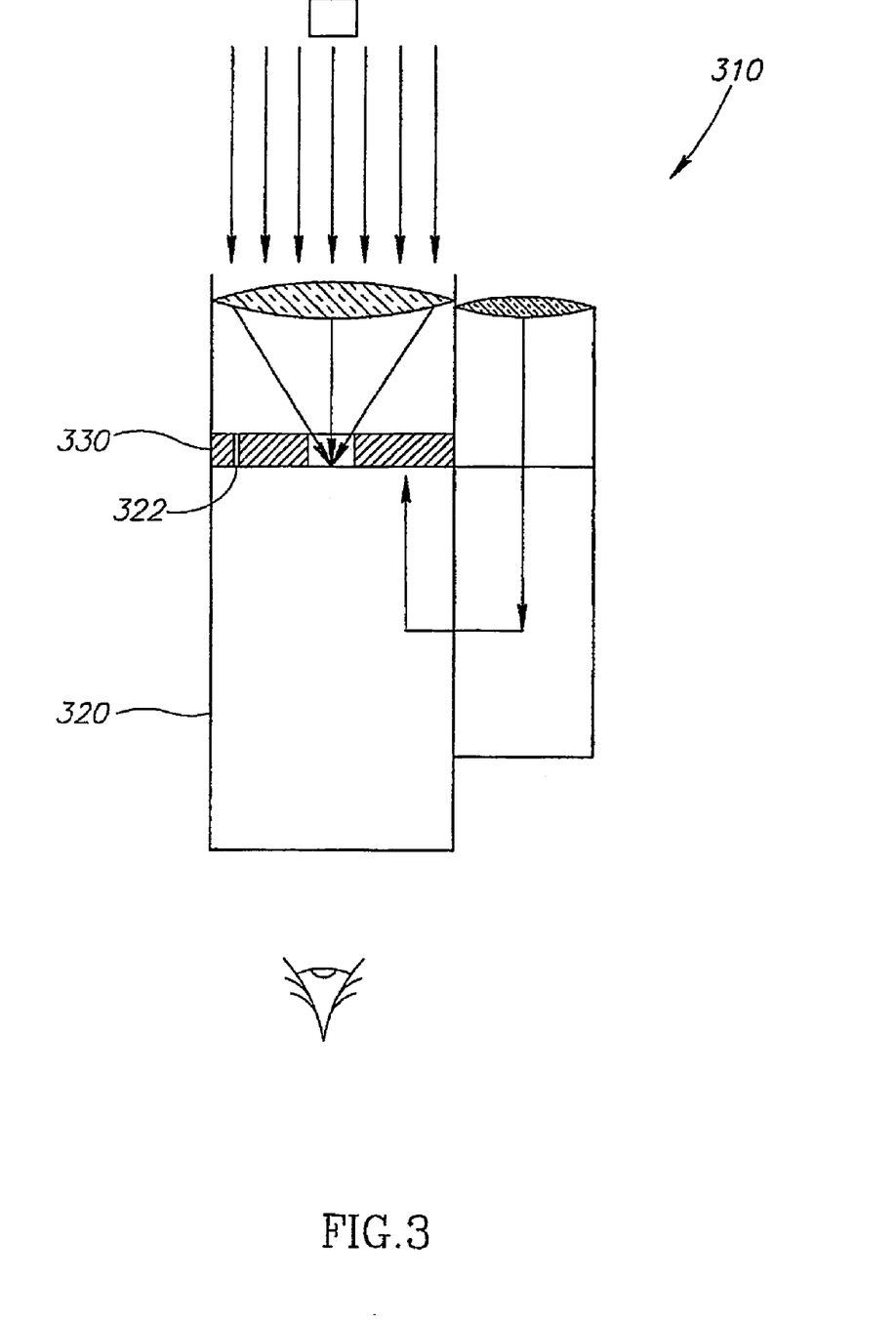
FIG. 3 is yet another schematic illustration of a passive night sighting system, the one illustrated in FIG. 2, wherein the transmissive MEMS type component is positioned as an integral part inside the image intensifier—at its input plane area.

Referring to FIG. 3, FIG. 3 is a schematic illustration of an additional version 310 of the passive night sighting system which is illustrated in FIG. 2, wherein the transmissive MEMS type component is positioned as an integral part inside the image intensifier 320—at its input plane area 322 (implemented on its photo sensitive surface area).

Figure 4:
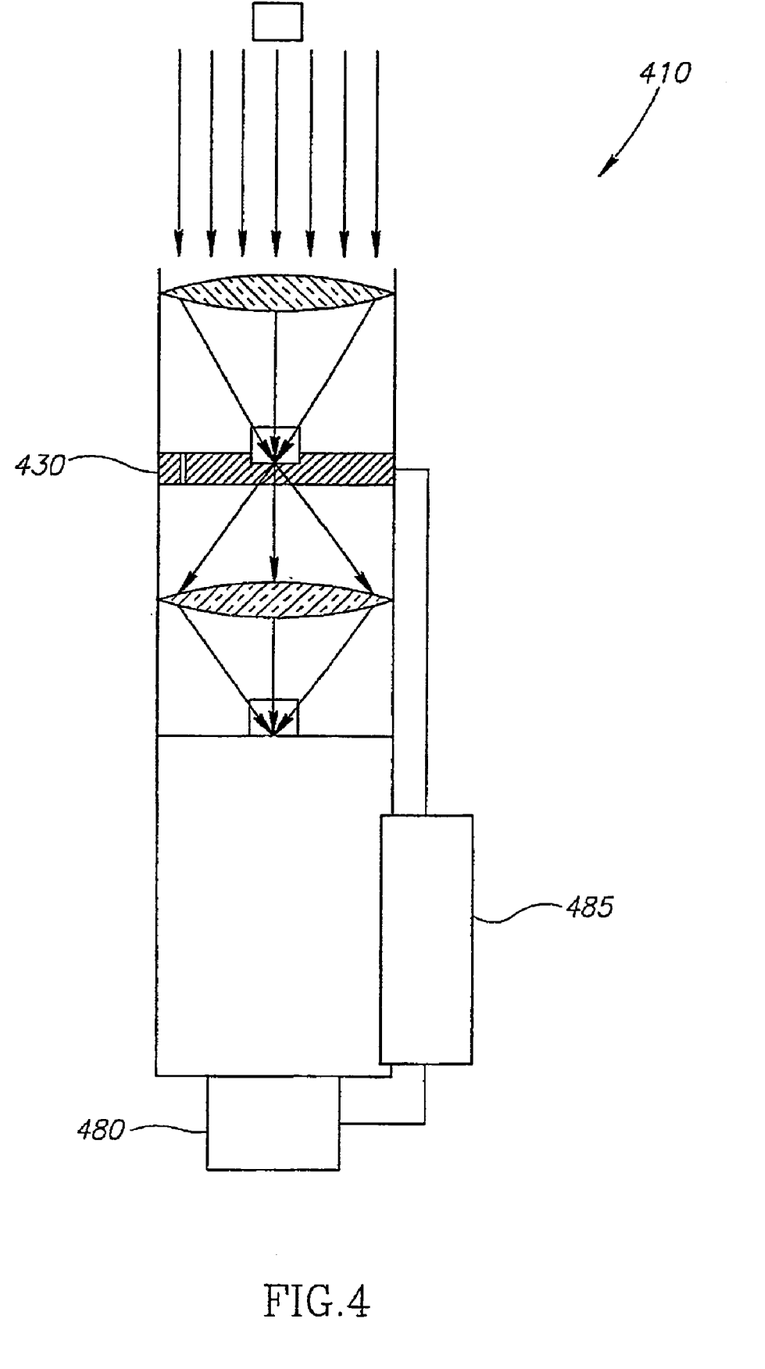
FIG. 4 is yet an additional schematic illustration of another version of a passive night viewing system, the one illustrated in FIG. 2, wherein the control and feedback circuit means is based on an image sensor that is embodied by a CCD/CMOS camera and that is positioned at the output focal plane of the image intensifier area.

Let's refer now to FIG. 4. FIG. 4 is a schematic illustration of yet another version (denoted 410) of a passive night viewing system, the one illustrated in FIG. 2, wherein the control and feedback circuit means, is based on an image sensor 480 intensifier that is embodied by a CCD/CMOS camera and that is part of an ICCD type image intensifier 420.

As is the case with the configuration drawn in FIG. 2, a transmissive MEMS 430 is used to regulate the amount of light enter the image intensifier 420. An image sensor 480, is attached to the image intensifier screen, captures the image and converts it to video format. An image processing circuit analyses the image controls the transmissive MEMS.

Figure 5:
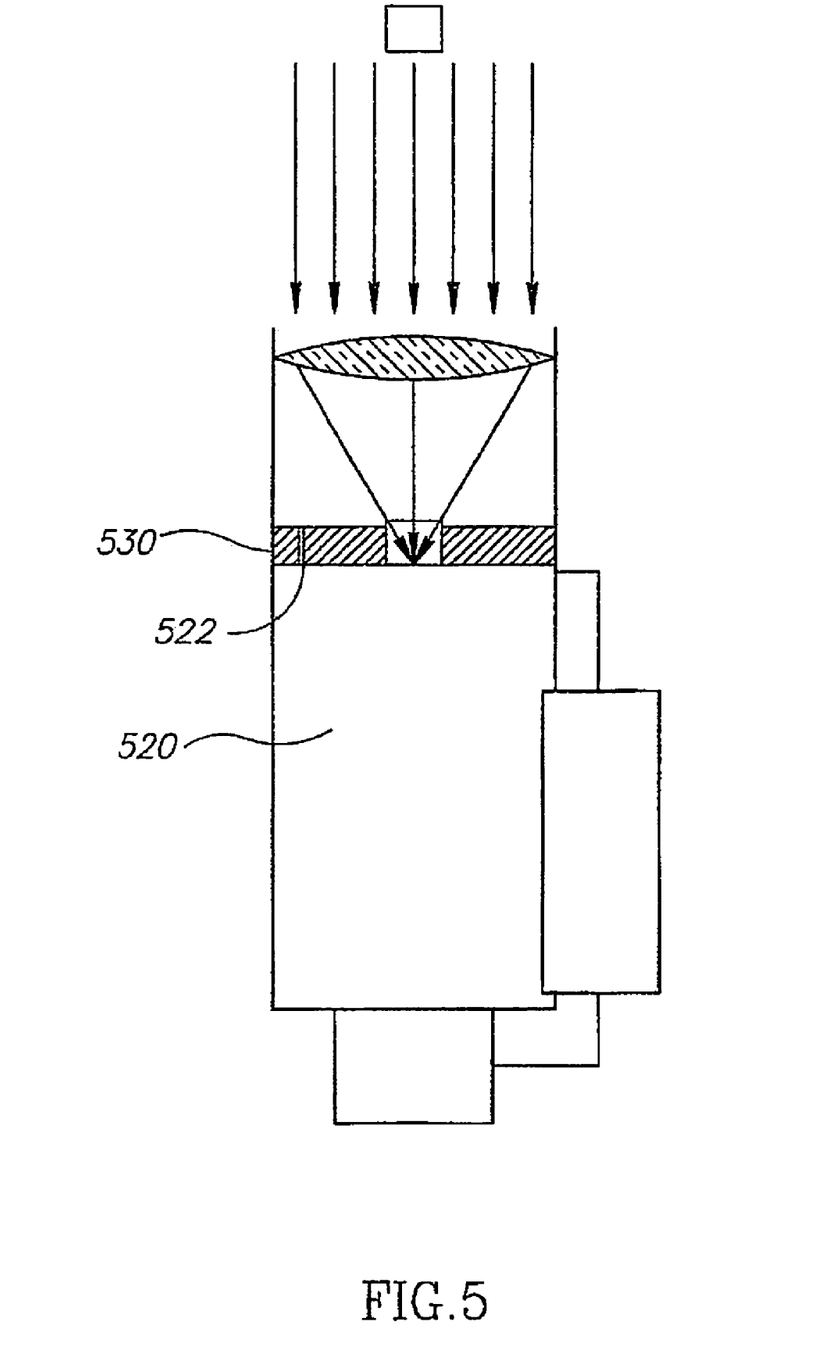
FIG. 5 is one more presentation of a schematic illustration of an additional version of the passive night viewing system presented by FIG. 4, wherein the transmissive MEMS type component is positioned as an integral part inside the image intensifier—at its input plane area.

Reference is being made to FIG. 5, FIG. 5 is a schematic illustration of an additional version, namely version 510 of the passive night viewing system illustrated in FIG. 4, wherein the transmissive MEMS type component 530 is positioned as an integral part inside the image intensifier 520—at its input plane area (implemented on its photo sensitive surface area).

Figure 6:
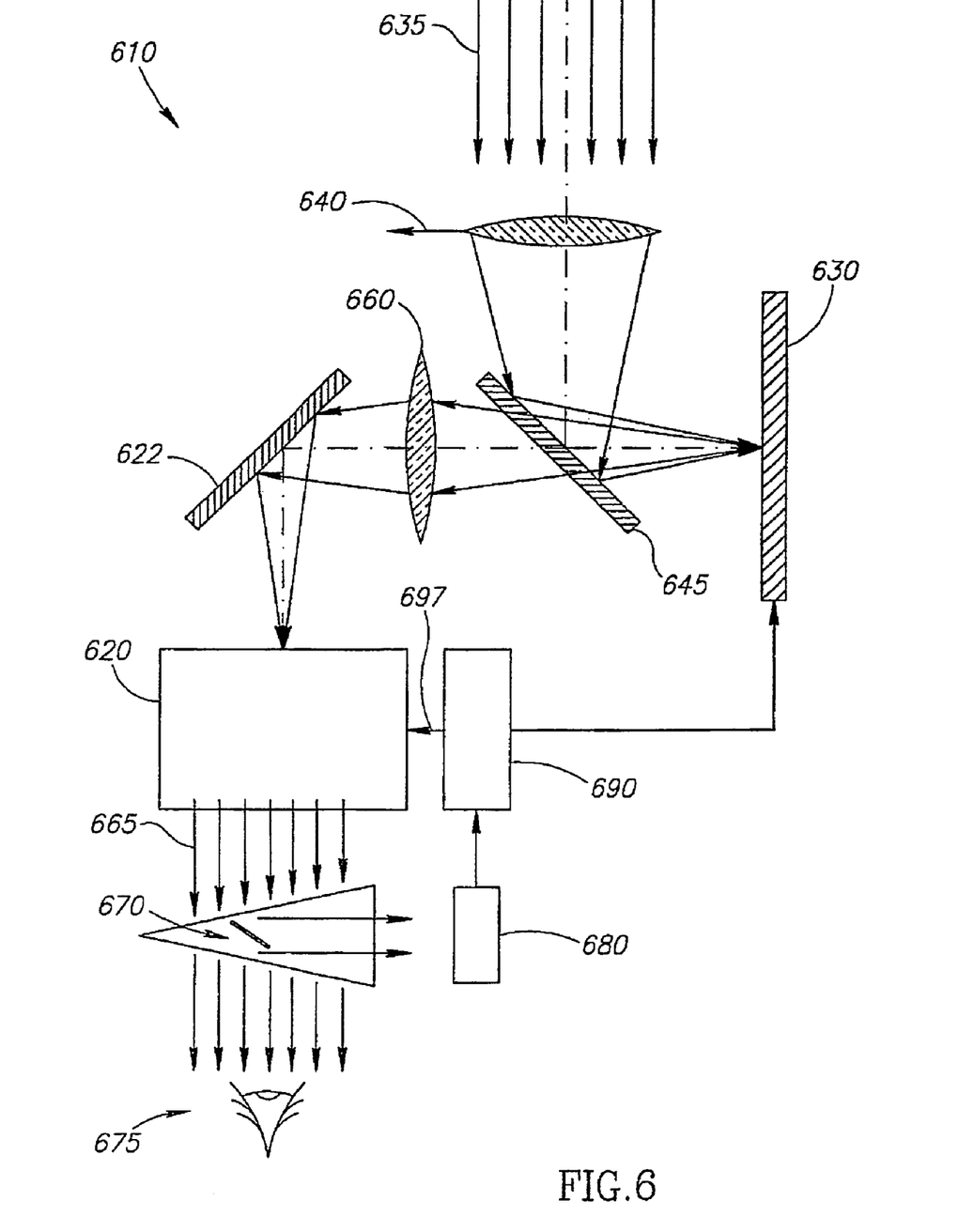
FIG. 6 is a schematic illustration of a passive night viewing system, wherein a third configuration of the present invention is embodied, namely regulating the light that enters specific areas of the image intensifier, by employing a light regulating means of the reflective MEMS type component, where in addition the light undergoes polarization, and wherein the control and feedback circuit is operating the image intensifier in a gating mode, for timing the light intensification provided by the image intensifier to the time slot after deflecting the light rays emanating from the intensely bright light areas away from the input plane of the image intensifier was completed.

Let's refer now to FIG 6. FIG. 6 is a schematic illustration of a passive night viewing system 610, wherein a third configuration of the present invention is embodied, namely regulating the light that enters specific areas of the image intensifier 620, by employing a light regulating device of the reflective MEMS type component 630, and where in addition the light undergoes polarization (in order to reduce losses), and wherein, as well, the control and feedback circuit device 685 operates (see 697) in addition the image intensifier 620 in a gating mode, for timing the light intensification provided by the image intensifier 620 to fit the time slot after deflecting of the light rays emanating from the intensely bright light areas away from the input plane of the image intensifier 620 is substantially completed (moving of the reflective MEMS 630 mirrors).

The light reflected (635) from the sector being observed is routed via lens 640 to beam splitter 645. The beam of light rays is directed from beam splitter 645 towards the light regulating means, which is implemented by the reflective MEMS 630. The beam of light rays is reflected from the light regulating means 630 (in its entirety or only parts of it, depending on the sate of operation of the mirrors array), in the same plane but at a reversed (an opposing) polarity. The polarized beams pass via splitter 645 and are received upon lens 660's surface. Lens 660 focuses the beam on a reflective lens 662 that projects the light unto the input of image intensifier 620. In a similar manner to the configuration illustrated by FIG. 1, the intensified image 665 is routed to a splitter component 670. The splitter component 670 splits the intensified image and projects it simultaneously into two directions—in one direction to the viewer's system 675 (the person's eye in the illustrated example; another example might be a screen), and in the second direction it is projected unto the image sensor 680 (for example, a CCD camera or a CMOS device). Image sensor 680 constitutes the first component of the control and feedback circuit means 685 that also includes the image processor 690. The control and feedback circuit means 685 selectively drives the reflective MEMS 630 mirrors and switches the image intensifier to a shut down ("OFF") condition for the duration of time that is essentially equal to the time required by the reflective MEMS 630 to deflect the beams that generate the glare areas away to the outside of the image intensifier input entrance.

Note also that, by studying the configuration of system 610, any professional in this field would understand, that the image intensifier 620 might as well have an additional gating capability as aforementioned, that would enable integrating the system into a surveillance system that is based on the gating imaging principle with or without an auxiliary source that illuminates the target (for example, a laser beam source), for obtaining timed light reflections from the selected target.

Figure 7:
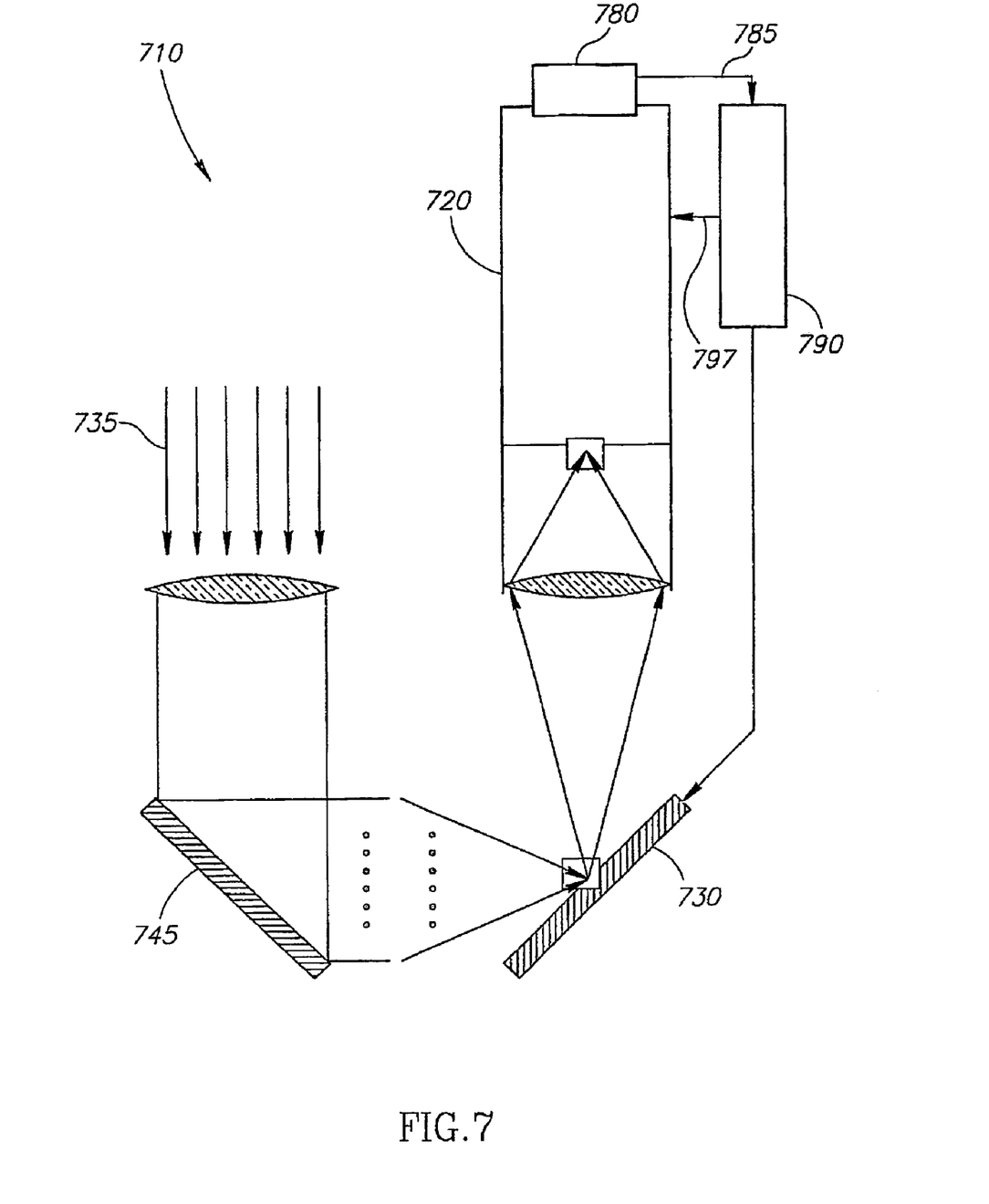
FIG. 7 is a presentation of a schematic illustration of an additional version of the passive night viewing system presented in FIG. 1, wherein the received light beam is folded at its direction by 180°.

Reference is being made to FIG. 7 which is a presentation of a schematic illustration of an additional version 710 of the passive night viewing system presented in FIG. 1, wherein the received light beam 735 is folded at its direction by 180°.

Reflective MEMS 730 is positioned in 45 degrees relative relation to lens 740 and at one state of affairs, reflects the light unto lens 745 that is focused on the micro mirrors of the MEMS. An image sensor 780 is attached to the image intensifier 720 that captures the image and converts it into a video format; an image processing circuit 790 analyses the image and controls the reflective type MEMS 730.

Concurrently, the control and feedback circuit means 785 switches the image intensifier to a shut down ("OFF") condition for the duration of time that is essentially equal to the time required by the reflective MEMS 730 to deflect the beams that generate the glare areas away to the outside of the image intensifier input entrance.

In view of the foregoing discussion, it is evidently clear that any professional in this field would understand, that in systems in which the light regulating means is of the reflective MEMS type, and in addition one observed the intensified image in an un-direct manner, but rather views it using a camera, it is possible to avoid the "smearing" by switching of the camera itself rather than image intensifier.

Figure 8:
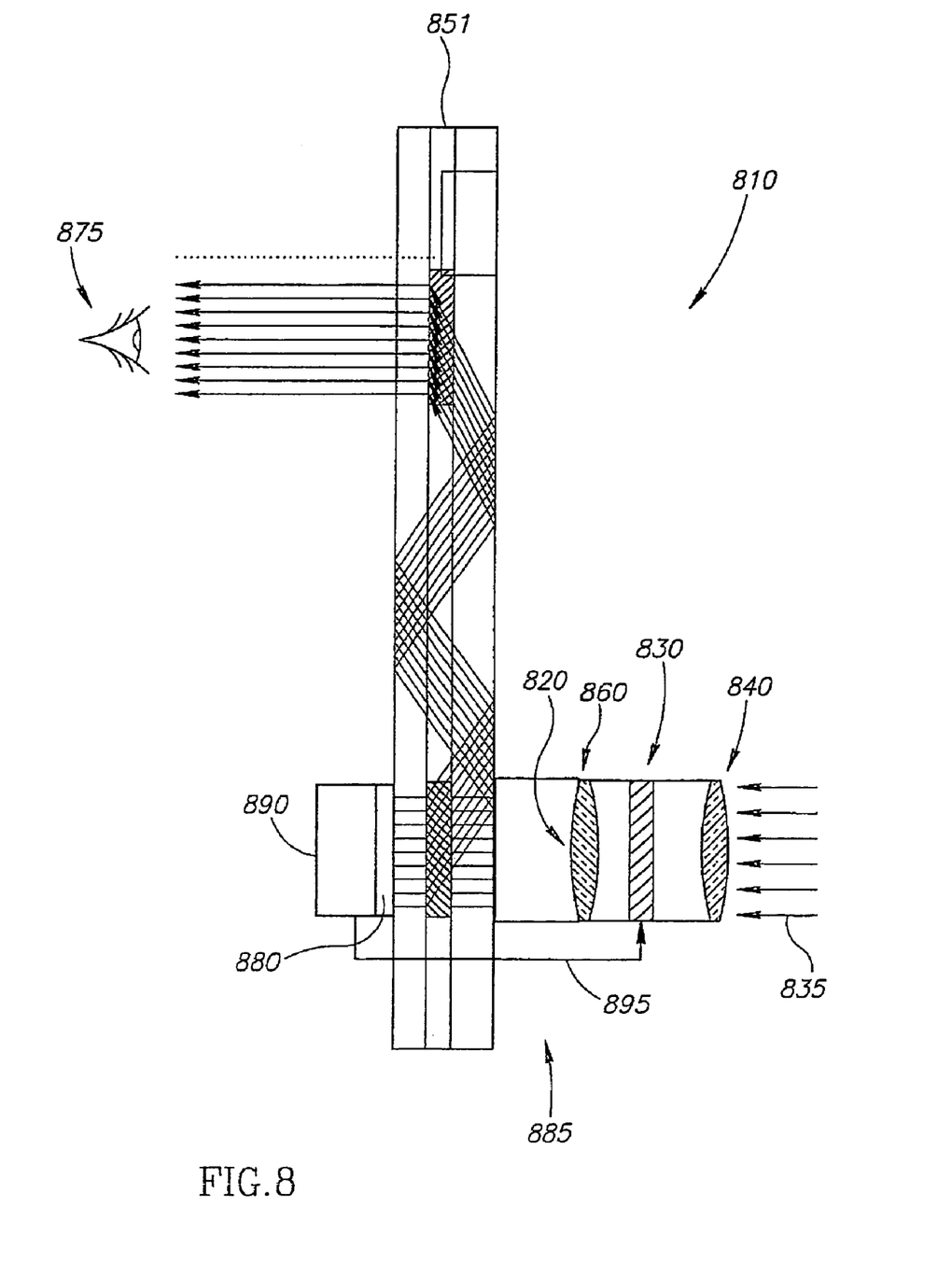
FIG. 8 is a schematic illustration of combining a system for controlling light amenable to be intensified by an image intensifier in accordance with the present invention, with a planar optics technology, such that a display of the intensified image in a planar packaging mode is enabled, to be viewed jointly by both the eye of an observer and a camera focused on it.

Let's refer now to FIG. 8. FIG. 8 is a schematic illustration of a combination of a system 810 for controlling light amenable to be intensified by an image intensifier in accordance with the current invention with a planar optics technology, such that a display of the intensified image in planar packaging mode is enabled, to be viewed jointly by both the eye of an observer and a camera.

A planar optics technology implements holograms optics for the sake of simultaneously displaying an image to a person's eye and to a camera, for example—HUD (head up display) applications. Such a technology is described, for example, in patent applications submitted in the United States of America, e. g., Ser. No. 09/647,520 and No. 60/357,290 submitted by the applicant of the present patent application and thus their contents is therefore incorporated by reference.

In the illustrated example, a transmissive MEMS component 830 is located upon a glass plate assembly 851. Light photons 835 are routed through an objective lens 840 towards the transmissive MEMS 830 that is located at its focal plane. The light that is transferred through transmissive MEMS 830 (in accordance with the state of operating the various areas on its surface) is intensified by image intensifier 820. The image of the intensified entity is split by the implementation of the planar optics, into the image that is observed by the viewer's means 875 (a person's eye in the illustrated example) and into an image whose picture is taken by image sensor 880 (e.g., a CCD/CMOS camera).

Image sensor 880 constitutes the first component of the control and feedback circuit means 885 that includes in addition the image processor 890 and connection 895 through which the image processor 890 drives the transmissive MEMS 830 in a manner similar to the operation described above when referring to FIG. 4.

It will be appreciated by persons who are skilled in the art, that the present invention is not limited by what has been particularly shown and described above. Rather, the scope of the present invention is only defined by the claims that follow.

The invention claimed is:

1. A system for handling light that is amenable for intensification by an Image Intensifier, and wherein the system includes—
   a light regulator adapted to regulate light intensity, wherein said light regulator is either positioned externally to said image intensifier at a focal plane of the light to be intensified, or placed internally at a focal plane of said image intensifier before the photo sensitive area of said image intensifier; and
   a circuit comprising an image sensor, wherein said image sensor is capable of detecting zones of intensely bright light areas in an acquired image and said circuit is coupled to an image processor that relates the locations of said zones with the respective areas on said light regulator, in a manner enabling operation of said respective areas on said light regulator, so that image received from said image intensifier is influenced; and
   wherein said system is characterized by—
   said light regulator being a transmissive MEMS component.

2. The system for handling light that is amenable for intensification by an Image Intensifier according to claim 1, wherein—
   said system is characterized by implementing a reflective MEMS component as said light regulator instead of using said transmissive MEMS, and wherein—
   said control and feedback circuit drives in addition said image intensifier to operate in a gating mode, in order to time the light intensifying action of said image intensifier to start upon the specific time slot that was essentially completed, of deflecting the light rays emanating from the intensely bright light areas away from the input plane of said image intensifier.

3. The system for handling light that is amenable for intensification by an Image Intensifier according to claim 1, wherein— said transmissive MEMS component is mounted as an integral part inside said image intensifier.

4. The system for handling light that is amenable for intensification by an Image Intensifier according to claim 1, wherein— said image sensor that detects the zones with intensely bright light areas is a CCD/CMOS camera.

5. The system for handling light that is amenable for intensification by an Image intensifier according to claim 4, wherein— said camera is located so that said camera can record/shoot items in parallel to the line of sight of said image intensifier and receives, independently, reflected light signals from the area under surveillance.

6. The system for handling light that is amenable for intensification by an Image intensifier according to claim 4, wherein— said camera is located at the output of said image intensifier in order to record/photograph the intensified image.

7. The system for handling light that is amenable for intensification by an Image Intensifier according to claim 1, wherein— said image sensor is a device of the ICCD type and is integrated in the image intensifier.

8. The system for handling light that is amenable for intensification by an Image Intensifier according to claim 1, wherin— said image intensifier is endowed with a gating capability, hence it is capable of timing the light being reflected from a target that was illuminated using an auxiliary source, for receiving timed light reflections from said illuminated target.

9. A passive night viewing system, that includes— an image intensifier equipped with a photo sensitive area upon which the image that can be intensified is projected, and wherein the intensified image is being observed at the output of said image intensifier; and wherein said passive night viewing system is characterized by the additional items that said system incorporates, namely— a system for controlling light signals that can be intensified by said image intensifier, and that includes— light regulator positioned at the focal plane of said light amenable for intensification at a location which is, however, before the photo sensitive area of said image intensifier; and a circuit that includes an image sensor, and wherein said image sensor detects the intensely bright light areas and an image processor that relates the intensely bright light areas that were detected using said image sensor to the respective areas of the light regulator, in a manner that enables operation of the light regulator in said intensely bright light areas in order to influence the image being received at the output plane of said image intensifier, and wherin— said system for controlling the light that can be intensified is characterized by that— said light regulator constitutes a transmissive MEMS component.

10. A passive night viewing system in accordance with claim 9, wherin— said light regulator constitutes a reflective MEMS component (instead of transmissive MEMS) and wherein said circuit drives, in addition, the image intensifier to operate in a gating mode, so that said circuit times the intensification of the light by said image intensifier to suit the specific time slot that was essentially completed, of deflecting the light emanating from the intensely bright light areas away from the photo sensitive surface area of said image intensifier.

* * * * *